United States Patent [19]

Hutchens et al.

[11] Patent Number: 4,796,237
[45] Date of Patent: Jan. 3, 1989

[54] METHOD FOR ACOUSTIC REVERBERATION REMOVAL

[75] Inventors: Chriswell G. Hutchens, Tulsa; Steven A. Morris, Sand Springs, both of Okla.

[73] Assignee: Amoco Corporation, Chicago, Ill.

[21] Appl. No.: 8,015

[22] Filed: Jan. 28, 1987

[51] Int. Cl.⁴ .............................................. G01V 1/40
[52] U.S. Cl. .................................... 367/35; 367/27; 181/105
[58] Field of Search ...................... 367/23, 24, 25, 35, 367/27, 34; 181/102, 104, 107, 105

[56] References Cited

U.S. PATENT DOCUMENTS 3,326,320  6/1967  Forester .................. 367/23
4,382,290  5/1983  Havira .................... 367/35
4,644,508  2/1987  Zachariadis ............. 367/24

Primary Examiner—Thomas H. Tarcza
Assistant Examiner—Ian J. Lobo
Attorney, Agent, or Firm—Scott H. Brown; F. E. Hook

[57] ABSTRACT

Disclosed herein are methods for canceling acoustic reverberations caused when acoustic energy impinges a medium. In one method, a series of positive pulses of acoustic energy are transmitted and the amplitudes of the resulting acoustic reverberations are measured. Negative pulses of acoustic energy are then transmitted having amplitudes equal to the immediately preceding received acoustic reverberation and at a time later than the positive pulses so that the acoustic reverberations are driven to a null.

7 Claims, 7 Drawing Sheets

METHOD FOR ACOUSTIC REVERBERATION REMOVAL

BACKGROUND OF THE INVENTION

1. Field of the Invention

The present invention relates to a method for improving the signal-to-noise ratio of a signal and, more particularly, to such a method for removing acoustic reverberations from the received signal.

2. Setting of the Invention

When an acoustic transducer has an electrical current passing across it, the transducer material will expand or contract to generate a positive or negative respectively pulse of acoustic energy. The acoustic energy passes through the surrounding environment and portions of the acoustic energy will be reflected back to the transducer upon contacting boundaries between disparate mediums. A problem exists where the acoustic energy contacts a relatively thin boundary layer between two disparate mediums, because of the 'ringing' caused by closely spaced reverberations within the layer. The magnitude and time duration of the ringing is such that reflections from other outer boundaries can be totally obscured, that is, the ratio of the signal desired to be investigated to the ringing from the thin layer is considered so poor as rendering an analysis of the signal ineffective. An example of this problem will be described below.

In the art of oil and gas production from a wellbore, ultrasonic transducers in contact with the well casing can be used to investigate the quality of the cement bond between the column of cement surrounding a casing set within a wellbore. This tool utilizes one or more acoustic energy transducers to transmit acoustic energy pulses that pass through the casing, cement, and the surrounding formation. The acoustic reflections are received within the tool to produce a signal for analysis by an operator at the surface. The acoustic problem exists here because a thin, highly acoustically mismatched medium, i.e., the casing, exists between the transducer and the medium to be interrogated, i.e., the cement. As stated above, the casing causes ringing, and this ringing obscures the portions of the received signals of interest, such as reflections from cement defects interface and the cement-formation interface.

Various commonly known numerical methods can be used to improve the signal-to-noise ratio, such as those used by those skilled in the art in geophysics. These methods require the use of digital computers and cannot be practically implemented in a downhole well logging tool.

SUMMARY OF THE INVENTION

The present invention provides a method and related system for canceling acoustic reverberations caused when acoustic energy from a source, such as a transducer, impinges a layer, such as a casing. In the method, a positive acoustic pulse is transmitted, and the amplitudes of each of the resulting acoustic reverberations are measured. A negative acoustic pulse is transmitted with an amplitude equal to the immediately preceding received acoustic reverberation from the positive pulse. The time between the transmission of the positive acoustic pulse to the transmission of the negative acoustic pulse to cancel the effects of the acoustic reverberations is varied so that the negative acoustic pulses counteract or drive the acoustic reverberations to a null.

DETAILED DESCRIPTION OF THE PREFERRED EMBODIMENT

The present invention provides a method and related system for canceling the effects of acoustic reverberations caused when acoustic energy from a source impinges a medium. In one embodiment of the method, a series of positive acoustic pulse is transmitted, and the amplitudes of each of the resulting acoustic reverberations are measured. A negative acoustic pulse is also transmitted with an amplitude equal to the immediately preceding received acoustic reverberation. The time between the transmission of a positive acoustic pulse to the transmission of a negative pulse (to cancel the effects of the acoustic reverberations) is varied so that the negative acoustic energy pulses counteract or drive the acoustic reverberations to a null. Even though acoustic pulses are bipolar, a positive pulse means herein a pulse of acoustic energy formed by an outward (expansion) initial pulse from a transducer, and a negative pulse means herein a pulse of acoustic energy formed by an inward (contraction) initial pulse from a transducer.

Figure 1A:
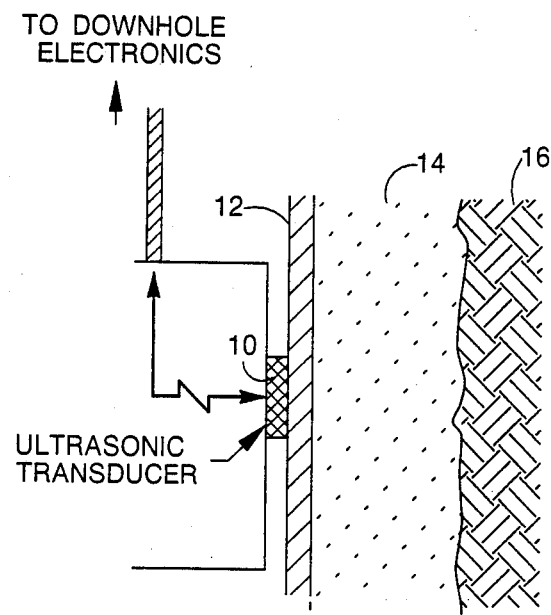
FIG. 1A is a cut away elevational view of an ultrasonic device, embodying the present invention, having a transducer placed in contact with a casing for identifying cement defects.
Figure 1B:
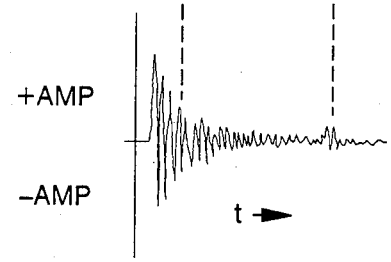
FIG. 1B is a signal amplitude vs time plot of a received signal from the transducer shown in FIG. 1A.

As shown in FIG. 1A, a transducer 10, carried on a wireline tool, is placed in contact with an interior surface of a casing 12 which is bonded via a column of cement 14 to a subterranean formation 16. The transducer 10 is preferably in direct contact with the casing 12, but can be spaced away therefrom, as is well-known to those skilled in the art. When an electrical current is provided to the transducer 10, a pulse of acoustic energy is transmitted outward through the casing 12 into the cement 14 and the formation 16. The acoustic reflections are received at the transducer 10 or another transducer (not shown), and the signal plot shown in Figure 1B illustrates the casing ringing which obscures the desired signal signal from the reflection of the casing-cement interface and the cement-formation interface.

Figure 2:
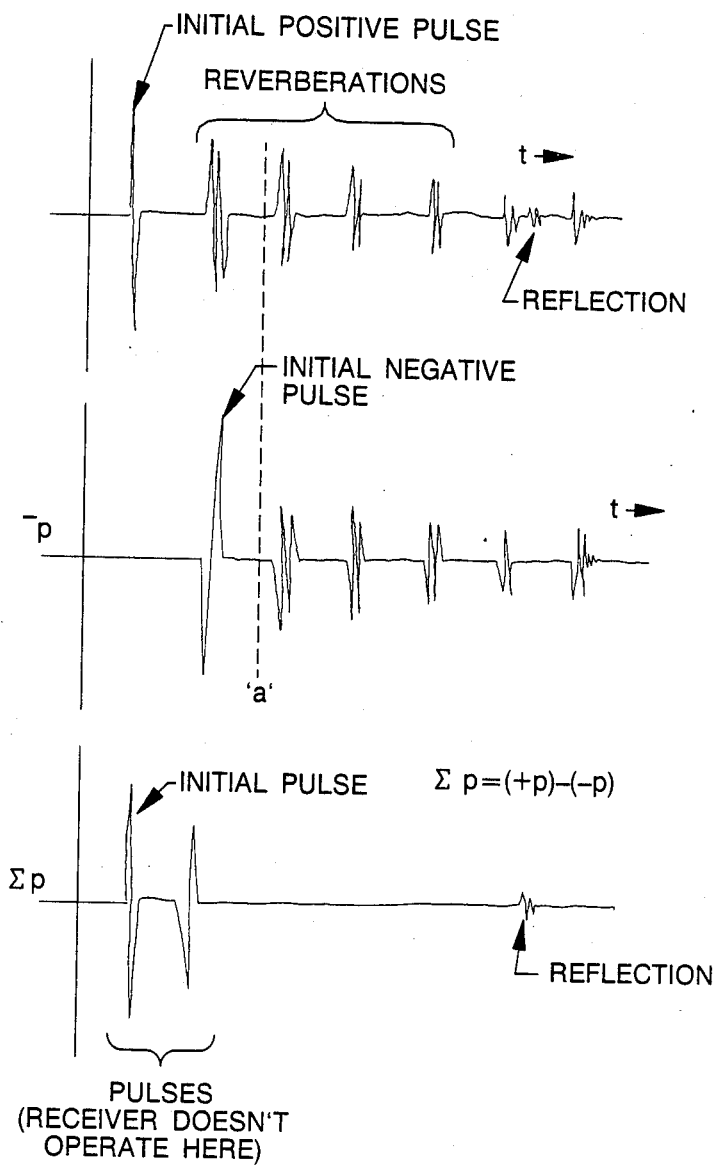
FIG. 2 is a diagrammatic representation of a series of positive acoustic reverberations and a corresponding series of negative acoustic pulses used to cancel the positive acoustic reverberations.

The inventors hereof have found that if a transducer is fired to produce a positive pulse of acoustic energy on a predetermined timing sequence; i.e., every certain number of microseconds, the same or another transducer can be fired to produce negative pulses equal in amplitude to the received acoustic reverberations and having a time delay to drive the acoustic reverberations to a null. The inventors have found that if a positive pulse produces a waveform "+p" and a negative pulse produces a waveform "−p" which is approximately the negative of "+p", then because of superposition, the actual received waveform Σp="+p"+"−p" gives a waveform which has reduced reverberations and the reflection is not affected. As shown in FIG. 2, what is labeled as "+p" is a receiver signal amplitude vs time plot from each positive pulse of acoustic energy which includes the high amplitude, sharp pulse of acoustic energy followed by a series of reverberations, such as from casing ringing. The acoustic reverberations have a decreasing amplitude, called a ring-down effect, but maintain constant timing. Because of the casing ringing, the reflection of interest, such as the casing-cement-interface, is almost obscured.

What is labeled as "−p" is a signal amplitude vs time plot of a series of negative pulses of acoustic energy having a decreasing amplitude equal to the decreasing amplitude of the acoustic reverberations in "+p". Also, the time delay between the negative pulses of acoustic energy is equal to the timing of the acoustic reverberations from the positive pulses of acoustic energy. What is desired is for "−p" to be a generated mirror image of "+p", but without the initial positive pulse of acoustic energy and the reflection portion of the signal.

The inventors hereof have found that if "−p" is added to "+p" to be labeled "Σp" that what will remain is the desired reflection, i.e., the acoustic reverberations will have been cancelled or have been driven by the negative pulses to a null.

Another way to express the combination of the positive pulse reverberations with negative, opposite pulses is as follows and shown in FIGS. 3A and 3B. The waveform due to the positive pulse can be expressed as:

$$P_1(t) = D_1 \sum_{n=0}^{\infty} K_o^n P(t - n\tau) + E(t) \quad (1)$$

where:
D$_1$ is a constant proportional to the drive pulse amplitude
K$_o$ is the reverberation constant which determines the rate of decay of the train of multiple echoes
P(t) is the waveform that would be received by the transducer from the casing/cement interface if no multiple echoes were present
τ is the time between multiple echoes and corresponds to the two way acoustic travel time across the casing
E(t) is the echo from an object beyond the casing.
The negative pulse is transmitted at t=τ$_f$ and can be expressed by:

$$P_2(t) = -D_2 \sum_{n=0}^{\infty} K_o^n P(t - n\tau - \tau_f) + E(t - \tau_f) \quad (2)$$

where:
τ$_f$ is the delay between positive pulse and negative pulse. The amplitude of the negative pulse is adjusted so that:

$$D_2 = D_1 K_o \quad (3)$$

τ$_f$=τ adding P$_1$(t) and P$_2$(t)

$$P_1(t) + P_2(t) = D_1 \sum_{n=0}^{\infty} K_o^n P(t - n\tau) + E(t) - \quad (4)$$

$$D_1 K_o \sum_{n=0}^{\infty} K_o^n P(t - (n+1)\tau) - E(t - \tau)$$

The K$_o$ term in the second series is brought inside the summation to give K$_o^{n+1}$ so that the n terms in the first series cancel the n+1 terms in the second series leaving $$P_1(t) + P_2(t) = P(t) + E(t) - E(t-\tau) \quad (5)$$

Figure 3A:
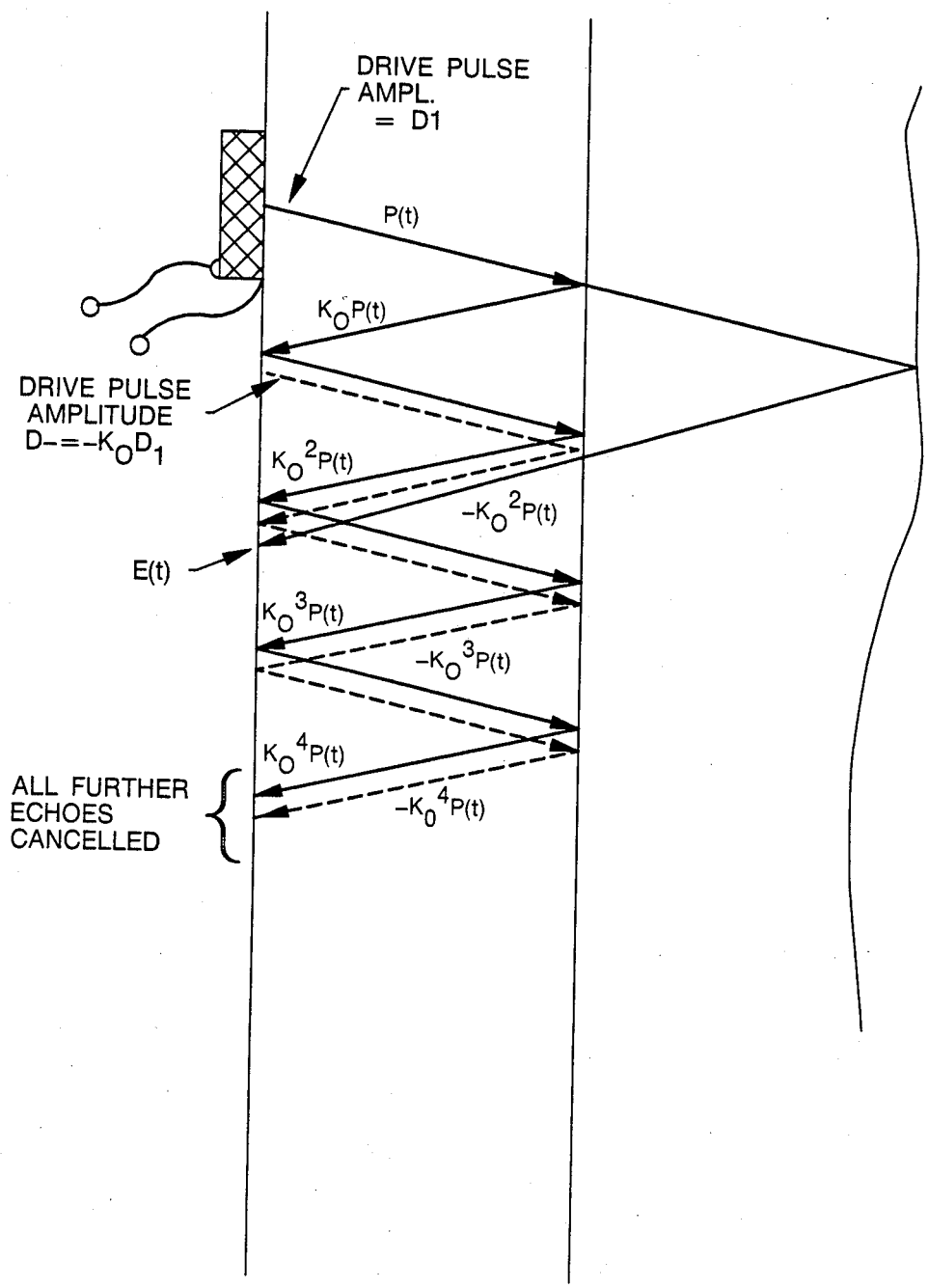
FIGS. 3A and 3B are diagrammatic representations of a series of acoustic pulses being reflected by casing and cement.
Figure 3B:
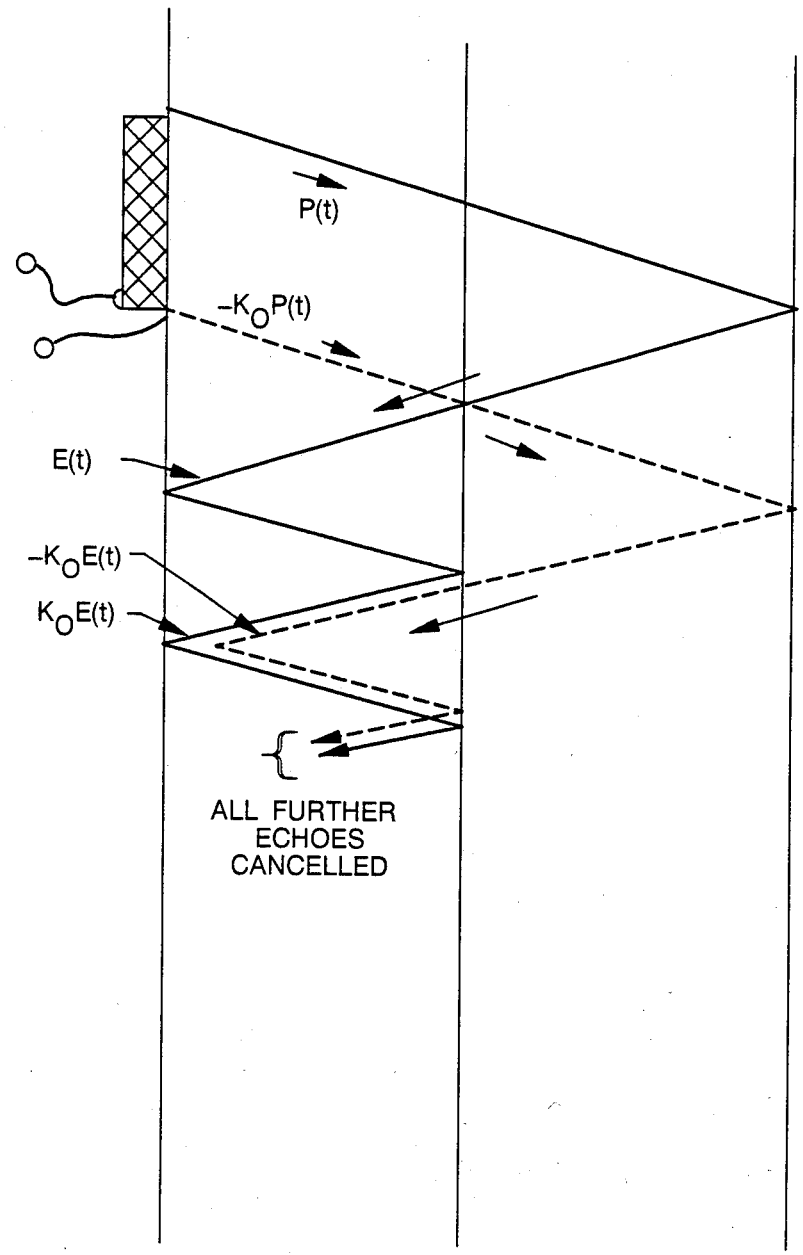

FIG. 3A illustrates Equations (1)–(5). In actual practice, the E(t) signal generates a train of echoes when passing through the casing. But these echoes are cancelled in Equation (4) as shown in FIG. 3B. Note P(t) in (5) occurs at the same time as the negative firing pulse so can be ignored.

Figure 4A:
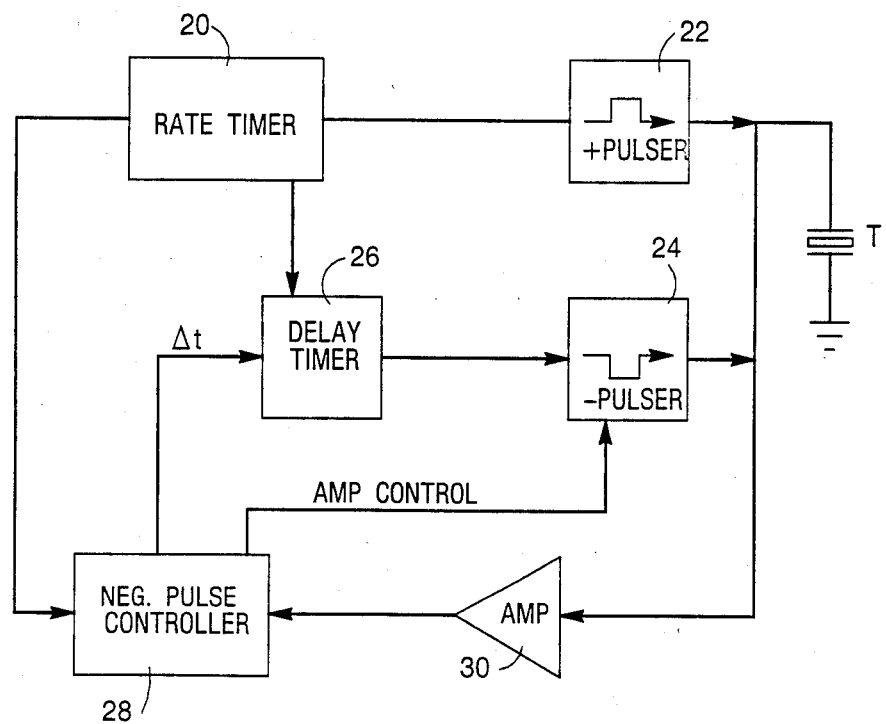
FIG. 4A is a circuit diagram of an analog embodiment of the present invention.

The removal of the acoustic reverberations can be achieved in an analog manner or in a digital manner, using hardwired circuitry or software. The primary need for the circuitry is to provide the ability to generate a negative acoustic pulse of appropriate amplitude and timing. The circuit in FIG. 4 includes the following components: A pulse rate timer 20 controls the system cycle rate and keeps the system synchronized by providing timing for the positive pulses, the negative pulse delay, and the negative pulse amplitude blocks. The positive pulse driver 22 is actually a circuit that provides electrical current to the transducer T to create a positive pulse while the negative pulse driver 24 creates the negative pulse. A delay timer 26 controls the timing of the negative pulse driver 24. A negative pulse controller 28 receives the incoming acoustic reverberations through an amplifier 30 and then controls the amplitude of the negative pulses by measuring and storing the amplitude of each reverberation for each positive pulse. It also controls the delay timer 26. How the amplitude is controlled and how the delay time (Δt) is controlled will be described in detail below. The system operates as follows. The positive pulse driver 22 causes a pulse of acoustic energy to be transmitted and the acoustic reverberations are received through the amplifier 30 to the pulse controller 28. The detection of the first acoustic reverberation is used to set the time delay (Δt) for the delay timer 26, as well as the amplitude of the negative pulses.

The amplitude and the time delay (Δt) values are adjusted dynamically to drive the reverberations to a minimum, and the amplitude control can be approached in two methods. In the first method, the amplitude of the negative pulses can be started at 0 and increases to a minimum value that will drive the acoustic reverberations to a null. The other method, which is preferred, is to use the first acoustic reverberation to estimate the amplitude setting. The first reverberation is then driven to a null by varying upon the receipt of each reverberation the cancellation amplitude and the time delay so that the minimum reverberation level is dynamically achieved. As previously discussed with reference to FIG. 3, the present invention can be established as hardwired, analog circuitry; however, software used with a programmable digital computer, and support hardware can accomplish equivalent results.

The digital method can be described broadly as receiving the signal including the desired reflection and the acoustic reverberations, storing the signal, scaling the amplitude of the acoustic reverberations to the amplitude of the original signal's acoustic reverberations but delayed a time ($\Delta t$), and subtracting the processed signal from the stored original signal to produce a signal from which the acoustic reverberations have been removed.

Figure 4B:
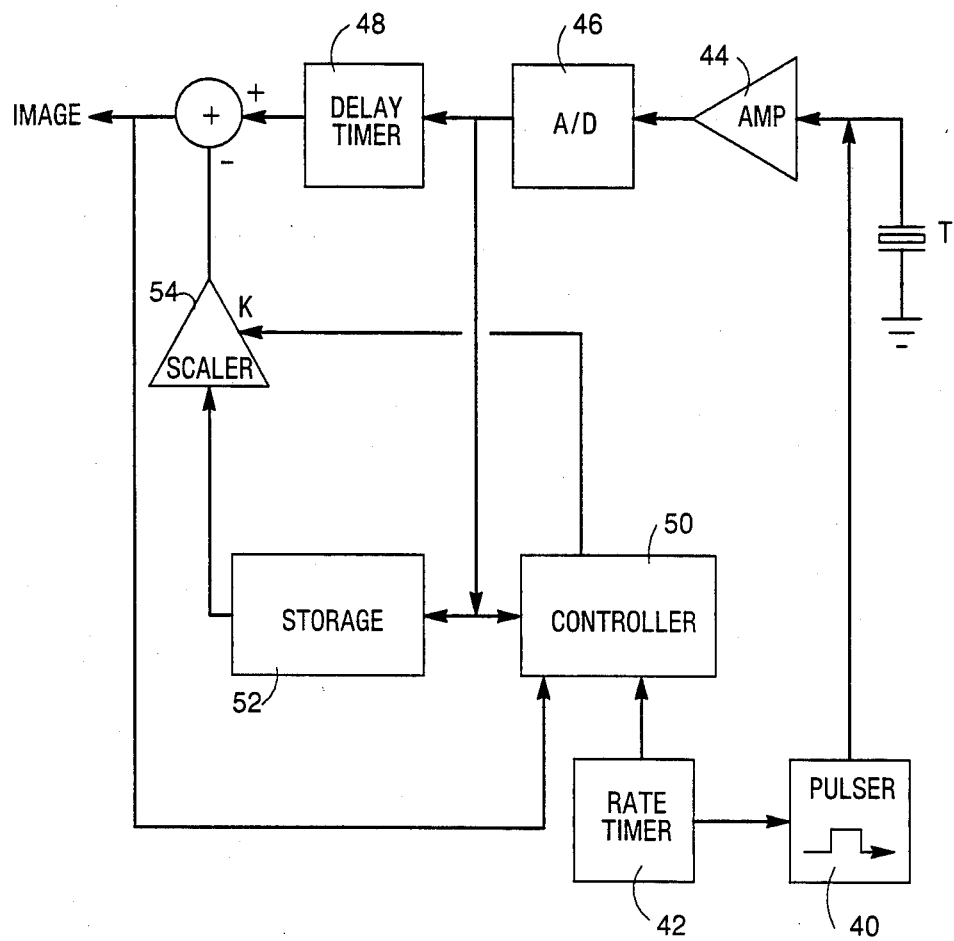
FIG. 4B is a circuit diagram of a digital embodiment of the present invention.

One embodiment that uses the above described digital method is shown in FIG. 4B wherein a digital pulse driver 40 causes a pulse of electrical current to pass to the transducer T a predetermined timing sequence as determined by a rate timer 42. The signal receiver at the transducer T is first amplified by amplifier 44 and then converted to digital form in an analog/digital converter 46. The digital signal is then sent to a delay timer 48, a controller 50, such as a microprocessor, and into memory 52 such as RAM, associated with the controller 50. An amplifier scaler 54 scales the amplitude of the stored signal to be equal to the amplitude of the original series of reverberations.

The delay timer 48 delays the original, unaltered received signal by a time corresponding to the time between acoustic reverberations within the layer and then the processed signal from the scaler 54 and the original signal from the delay timer 48 are combined to produce a signal that contains only the desired reflections, which is provided to an imaging device, such as a CRT, oscilloscope, or hardcopy generator.

The two dynamic variables used in the present invention are the measurement of the rate of decay of the amplitude of the acoustic reverberations and the measurement of the appropriate time delay. The measurement of the amplitude of the signals can be accomplished by analog circuits such as peak and hold circuits or by using software in a digital computer.

The measurement of the appropriate time delay can be accomplished by one of several open loop methods or by a signal derived method. Both methods can be analog or digital as needed. In the first open loop method, the first positive pulse of acoustic energy is transmitted and the resulting acoustic reverberations are received. The time of the firing of the acoustic transducer and the reception of the first acoustic reverberation is recorded and subtracted or separately counted to determine the first time delay ($\Delta t$). Thereafter, a negative pulse of acoustic energy is transmitted having an amplitude of the immediately preceding received acoustic reverberation and is adjusted dynamically as described above. The firing of the negative pulse is a time $\Delta t$ later than the firing of a second positive pulse, and $\Delta t$ is adjusted manually by the operator to achieve the best signal-to-noise ratio by visually reviewing the images.

Another open loop method of determining $\Delta t$ uses alternating cycles wherein on the first cycle, a positive pulse of acoustic energy to transmitted and a measurement is made from the acoustic reverberations to determine $\Delta t$. A second positive pulse of acoustic energy is transmitted and at a $\Delta t$ later than the second positive pulses' transmission, the appropriate negative pulse is transmitted at the time of each reception of the acoustic reverberations.

Figure 5:
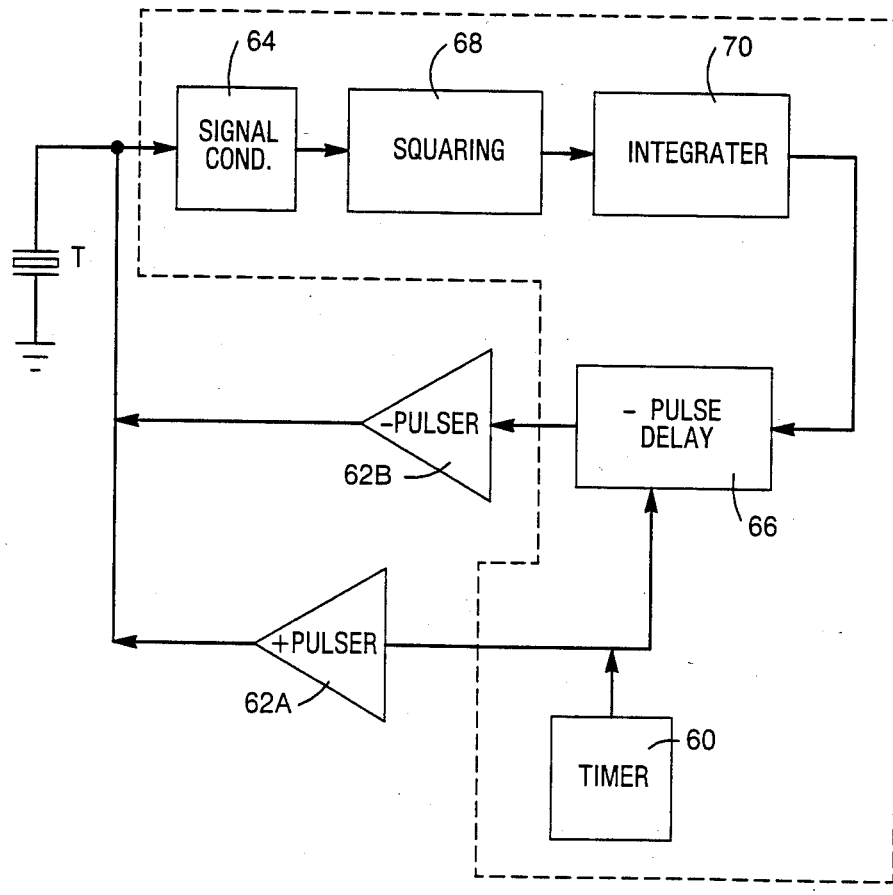
FIG. 5 is a circuit diagram of a digital system to adjust the time delay between the positive and the negative pulses.

A signal derived method for controlling the timed cancellation pulses is shown in FIG. 5. A timer 60 is used as a system clock and a positive pulse generator 62A causes a series of positive acoustic pulses to be transmitted from a transducer T. The receiver signal is conditioned in a signal conditioner 64 which provides amplification and, if needed, analog to digital conversion. A pulse delay block 66 has a timing delay which is the anticipated mean delay for a medium, such as the casing. This delay is adjusted by the operator or is updated dynamically after each repetitive pulse in the following manner. The transducer T output is approximated by a time shifted series of exponentially decaying sinusoids.

Wherein the present invention has been described in particular relation to the drawings attached hereto, it should be understood that other and further modifications, apart from those shown and suggested herein, may be made within the scope and spirit of the present invention.

What we claim is:

1. A downhole tool for use in determining the presence of defects in cement surrounding a casing set within a wellbore, comprising:
   a tool body adpated for suspension within the casing;
   an acoustic energy transmitting transducer carried by the tool body for transmitting positive pulses of acoustic energy;
   means carried by the tool body for receiving acoustic energy reverberations;
   means for measuring the time delay, $\Delta t$, between the transmission of a pulse of acoustic energy and the reception of the first acoustic reverberation;
   means for measuring the amplitude of the received acoustic reverberations, and
   means carried on the tool for transmitting a series of negative pulses of acoustic energy at a time, $\Delta t$, later than the transmission of each positive pulse of acoustic energy, and each having an amplitude equal to the measured amplitude of the immediately preceding received acoustic reverberation.

2. A method of enhancing the signal-to-noise ratio from a cement defect identification tool by cancelling the casing reverberation noise comprising:
   placing an acoustic energy transducer against the interior surface of a casing set within cement in a wellbore;
   transmitting a series of positive acoustic pulses, at a constant timing sequence, from the acoustic energy transducer;
   receiving an acoustic signal comprising a reflection of the casing-cement interface and casing reverberation noise;
   measuring the amplitude of each received casing reverberation noise portion of the acoustic signal;
   transmitting a series of negative acoustic pulses each having an amplitude equal to the immediately preceding received casing reverberation noise portion of the acoustic signal; and
   varying the time delay between the transmission of a positive acoustic pulse to the transmission of the negative pulses to cancel casing reverberation noise.

3. A method of enhancing the signal-to-noise ratio from a cement defect identification tool by canceling casing reverberation noise, comprising:
   (a) placing an acoustic energy transducer against the interior surface of a casing set within cement in a wellbore;
   (b) transmitting a pulse of acoustic energy from the acoustic energy transducer;
   (c) receiving an acoustic signal comprising a reflection of the casing-cement interface and casing reverberation noise;
   (d) storing a digital form of the acoustical signal;

(e) scaling the amplitude of the acoustic signal delayed a time (Δt) between the transmission of the pulse of acoustic energy and the reception of the acoustic signal; and (f) subtracting the scaled acoustic signal from the stored acoustic signal to generate a refined signal from which casing reverberation noise has been removed.

4. A method of claim 3 wherein step (e) includes multiplying the casing reverberation noise by a scaler constant K, wherein K is greater than or equal to one.

5. A system for enhancing the signal-to-noise ratio from a cement defect identification tool by canceling casing reverberation noise, comprising:

(a) an acoustic energy transducer carried on a tool adapted for suspension within a wellbore casing, the transducer placable against the interior surface of the casing set within cement in a wellbore;

(b) means for transmitting a pulse of acoustic energy from the acoustic energy transducer;

(c) means for receiving an acoustic signal comprising a reflection of a casing-cement interface and casing reverberation noise;

(d) means for storing a digital form of the acoustic signal;

(e) means for scaling the amplitude of the acoustic signal delayed at time (Δt) between the transmission of the pulse of acoustic energy and the reception of the acoustic signal; and (f) means for subtracting the scaled acoustic signal from the stored acoustic signal to generate a refined signal from which casing reverberation noise has been removed.

6. The system of claim 5 wherein the means for scaling the amplitude of the acoustic signal includes means for multiplying the casing reverberation noise by a scaler constant K, wherein K is greater than or equal to one.

7. A method of enhancing the signal-to-noise ratio from a cement defect identification tool by canceling casing reverberation noise, comprising:

(a) placing an acoustic energy transducer against the interior surface of a casing set within cement in a wellbore;

(b) transmitting at least one positive acoustic pulse from the acoustic energy transducer;

(c) receiving an acoustic signal comprising a reflection of the casing-cement interface and casing reverberation noise;

(d) measuring the amplitude of the received casing reverberation noise portion of the acoustic signal;

(e) transmitting a least one negative acoustic pulse having an amplitude equal to the received casing reverberation noise portion of the acoustic signal; and (f) varying the time delay between transmission of the positive acoustic pulse to transmission of the negative acoustic pulse to cancel casing reverberation noise.

* * * * *